Feb. 21, 1956  D. L. GETZ  2,735,572

FILLER CAP ASSEMBLY

Filed May 18, 1953

INVENTOR.
DELMOND L. GETZ
BY
Marshal Biebel French & Bugg
ATTORNEYS

United States Patent Office 2,735,572
Patented Feb. 21, 1956

2,735,572

FILLER CAP ASSEMBLY

Delmond L. Getz, Springfield, Ohio, assignor to The Steel Products Engineering Company, Springfield, Ohio, a corporation of Ohio Application May 18, 1953, Serial No. 355,710

6 Claims. (Cl. 220—25)

This invention relates to a filler cap assembly, and it has particular relation to filler cap assemblies adapted for use with fuel tanks and other containers wherein the interior of the container is under pressure, such for example as in the case of fuel tanks for airplanes.

One of the principal objects of the invention is to provide a filler cap assembly of the above type for the inlet of a container which is of very simple design and lightweight construction comprising a minimum number of parts in addition to a resiliently compressible sealing member, which can be quickly applied and removed with minimum effort and without requiring special tools, which will not only seal against internal pressure but will also seal against icing-over conditions capable otherwise of interfering with removal of the cap, and which will compensate within itself for swelling or shrinkage of the sealing member.

An additional object of the invention is to provide such a filler cap assembly which will present a substantially flush surface in closed position and is therefore particularly adapted for mounting on an exposed surface portion of an airplane, and which at the same time is capable of construction at sufficiently low cost to warrant its use on disposable fuel tanks for aircraft.

It is also an object of the invention to provide a filler cap assembly of the above type in which a single spring member provides a biasing action tending to hold the closure in closed position and also includes the parts which interlock with the inlet portion of the container to maintain the assembly in its closed position, and in which the member carrying this spring is separated from the retaining member for the compressible sealing member to allow the assembly to adapt itself to variations in the volume of the sealing member resulting from swelling or shrinkage.

Other objects and advantages of the invention will be apparent from the following description, the accompanying drawing and the appended claims.

In the drawing—

Figure 1:
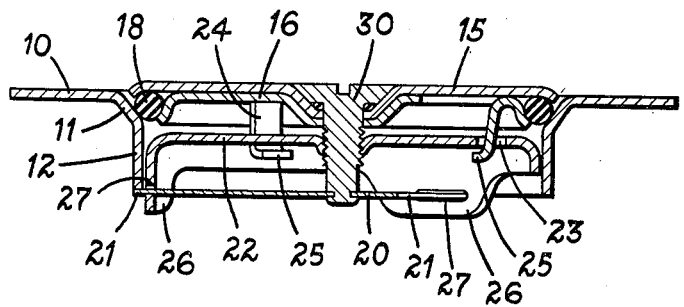
Fig. 1 is a sectional view of a filler cap assembly constructed in accordance with the invention and shown in closed position, the view being approximately on the line 1—1 of Fig. 3.

Referring to the drawing, which illustrates a preferred embodiment of the invention, the adapter includes a peripheral flange portion 10 adapted to be riveted or otherwise secured to a container such as a fuel tank of an airplane or other vehicles. A tapered annular rim 11 on the adapter surrounds the filling opening formed by an inner cylindrical flange 12, and the cooperating cap or closure includes a cover 15 proportioned to overlie the tapered rim 11. A back-up plate 16 is welded or otherwise secured to the underside of cover 15, and the outer edges of parts 15 and 16 are curved as shown to form a circumferential groove for receiving the compressible annular sealing member or gasket 18, shown as an O-ring of synthetic rubber, for sealing against the rim 11 in the closed position of the assembly, and these parts thus cooperate to form the closure for the adapter opening.

Figure 4:
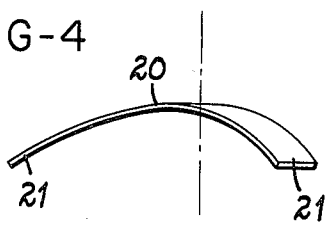
Fig. 4 is a detail view of the locking spring member of the assembly.
Figure 3:
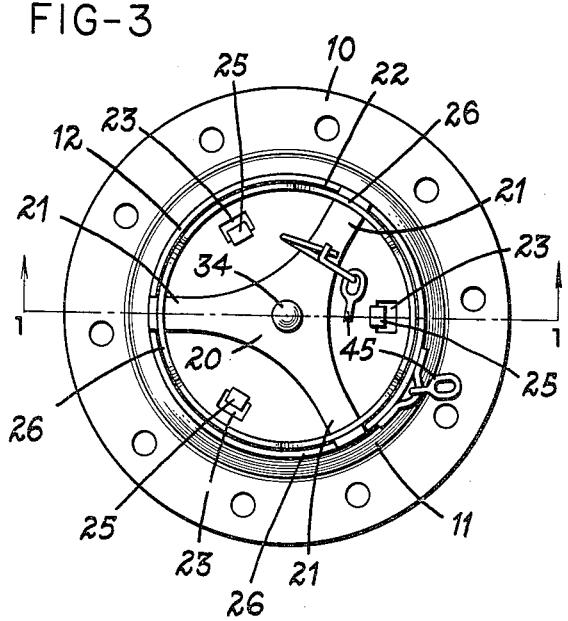
Fig. 3 is a bottom plan view of the filler cap assembly in closed position.
Figure 5:
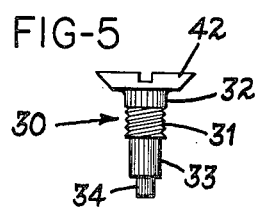
Fig. 5 is a detail view of the operating screw of the assembly.

The main locking member of this assembly is a leaf spring 20 having multiple arms 21 radiating from its central portion. The spring 20 is of bowed shape in its normal or unstressed condition as shown in Fig. 4, satisfactory results having been obtained with this spring having a normal position substantially conforming with the corresponding portion of a sphere. The spring 20 is carried by a retainer 22 which is in turn loosely carried by the back-up plate 16. As shown, the retainer 22 is provided in its top with three slots 23 which receive lugs 24 formed downwardly from plate 16, and these lugs are bent inwardly at their lower ends to form ears 25 preventing separation of the retainer 22 from the cap while still permitting relative axial movement thereof.

The spring retainer 22 includes three downwardly extending tongue portions 26 adapted to fit axially within the flange portion 12 of the adapter, and these tongues are slotted at 27 to receive the ends of the arms 21 on the spring. These parts are so proportioned that in the normal outwardly bowed condition of the spring, the arms 21 retract within the slots 27 so that the closure unit can be moved in and out of the adapter, but when the spring is deflected to substantially flat shape, the ends of the arms 21 project radially beyond the shell tongues 26 and into overlapping and thus interlocking relation with the inner end of the flange 12 as shown in Fig. 1.

The operating member for the locking spring 20 is a screw 30 of special construction including a threaded central portion 31 and non-threaded inner and outer portions 32 and 33 terminating in an end portion 34 which is riveted or peened to the center of the spring 20. The retainer 22 has a passage 35 therethrough which is tapped to receive the threaded portion 31 of screw 30, while the non-threaded screw portion 33 is freely slidable therethrough. The cover 15 and plate 16 have a non-threaded central passage 40 therethrough of sufficient diameter to receive the threaded screw portion 31 freely therethrough, and the central area of these parts is conically embossed at 41 to receive the tapered head 42 of screw 30 therein so that its upper end is flush with the surrounding surface of the cover. In addition the screw 30 carries an O-ring 44 which acts in the closed position of the assembly to seal the upper end of passage 40 against both access of moisture from without and escape of pressure from within.

Figure 2:
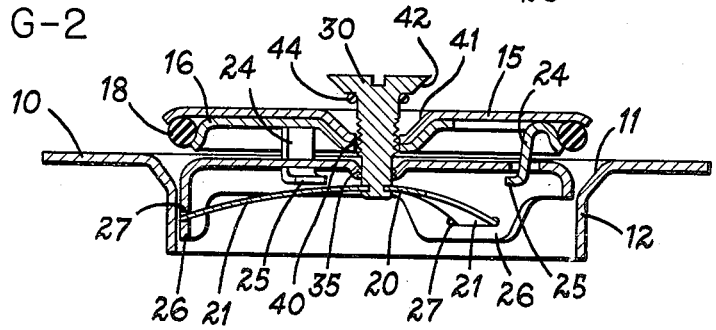
Fig. 2 is a view similar to Fig. 1 showing the filler cap assembly in released position ready for opening.

Fig. 2 shows this assembly in released position, and it will be noted that with the screw 30 unthreaded until the threads thereon are above passage 35, the natural action of spring 20 will cause it to bow upwardly and thus to raise screw 30 to its uppermost position by sliding its portions 31 and 32 in passage 40. With the parts in this position, the ends of the spring arms 21 lie within the slots 27 in tongues 26 but inwardly of the flange 12 so that the unit can be readily removed from or inserted in the adapter. The chain 45 may be provided as shown to prevent total separation of the cap assembly from the adapter when the cap is open.

To close the container opening, the cap assembly is inserted into the adapter as shown in Fig. 2 until the seal 18 is resting on the tapered surface 11 of the adapter flange 10. A suitable tool such as a screw driver or large coin is then inserted in the slotted head of screw 30, and the screw is forced downwardly until the threads thereon are in position to engage the tapped passage 35. This forces the retainer 22 down until it rests on the ear portions 25 of lugs 24, and in this position of the parts, the spring 20 is sufficiently deflected towards flatness for the ends of the arms 21 to begin extending over the lower rim of flange 12. The screw 30 is then threaded into the passage 35 to force the spring 20 downwardly until it is effectively flat and then to draw the assembly of the spring 20 and retainer 22 upwardly until the spring arms 21 are in overlapping and interlocked relation with the flange 12, and during this movement, the screw head 42 works against the embossment 41 to draw the cover 15 down until the seal ring 18 is tightly seated on the portion 11 of the adapter.

Fig. 1 shows the cap assembly in this closed position, and it will be noted that while it is in this position the projecting ends of the spring arms 21 which provide the effective lock for the cap assembly within the adapter, the ends of these arms are closely supported by the tongues 26 so that stresses tending to force the cap open as a result of pressure within the container are concentrated in direct shear at points closely adjacent the slots rather than intending to bend the entire area of the spring. This results in a strong and effective lock capable of resisting relatively high pressures within the container without damage to the assembly. At the same time, with the ring 18 sealing on the rim 11 as shown, both escape of pressure from within the container and leakage of moisture from outside the container through the space between the closure and the adapter are effectively prevented, and the ring 44 provides a similar two-way seal at the upper end of the passage 40.

It will accordingly be seen that this filler cap assembly is very simple to use, requiring as it does no special tools for either removal or replacement. When the unit is to be opened, it is merely necessary to unscrew the screw 30 until its threaded portion is out of engagement with the threaded passage 35, which is readily done with a coin or suitable tool such as a screw driver, and then the natural force of the spring 20 in returning to its normal bowed shape will both raise the screw to its upermost position and at the same time release the spring ends 21 from their locked engagement with flange 12. In addition, this filler cap assembly offers advantages of economical production, and the component parts thereof are individually so simple to produce and assemble that these units can be made at sufficiently low cost to warrent their use on disposable fuel tanks and other containers.

The loose connection between the cover 15 and the spring retainer 22 offers special practical advantages in the cap assembly of the invention. In particular, it provides for adjustment between the cap and the adapter to compensate for swelling or shrinkage of the sealing gasket, such as may occur when used with some types of aviation gasoline and oil, and at the same time, there is no likelihood of the parts accidentally becoming separated. Thus while the assembly will normally be proportioned to fit an adapter of standard size, swelling or shrinkage of the gasket will cause corresponding variation in the seated position of the cap, and if the cap and retainer were rigidly connected, substantial swelling of the gasket would tend to prevent insertion and locking of the unit, while substantial shrinkage of the gasket could cause leakage. With the construction of the invention, however, such variations are readily compensated for by the flexibility of the loose connection between the closure and the retainer.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A filler cap assembly for the inlet of a container to retain positive pressure on the contents thereof, comprising means including an annular rim and a tubular flange extending from said rim inwardly of the container forming an inlet opening for said container, a closure including a compressible annular gasket adapted to seal against said rim, a retainer receivable in close fitting relation within said opening and having a connection with said closure, a leaf spring carried by said retainer and having a generally spherically outwardly bowed shape in the unstressed condition thereof, said spring including a plurality of arms radiating from the central portion thereof and proportioned in said unstressed position of said spring to lie within the diameter of said opening, an operating member movable axially in said retainer between respectively raised and lowered positions, means securing said central portion of said spring to said operating member for deflection thereby to a more nearly flat shape in said lowered position of said operating member to cause said arms to project radially of said retainer into overlapping and interlocked relation with said flange, guiding means located at substantially the periphery of said retainer for closely supporting relation with said projecting arm ends in the locked position thereof, said operating member including a portion connected with said closure and responsive to deflection of said spring by said operating member to draw said closure into sealed relation with said rim, and said connection between said closure and said retainer including loosely interfitting parts providing for limited axial movement of said closure with respect to said retainer to compensate for variations in the cross-sectional size of said gasket.

2. A filler cap assembly for the inlet of a container to retain positive pressure on the contents thereof, comprising means including an annular rim and a tubular flange extending from said rim inwardly of the container forming an inlet opening for said container, a closure including a compressible annular gasket adapted to seal against said rim, a retainer receivable within said opening and having a connection with said closure, a leaf spring carried by said retainer and having an outwardly spherically bowed shape in the unstressed condition thereof, said spring including a plurality of arms extending from the central portion thereof generally radially of said retainer and proportioned to lie within the diameter of said opening in said unstressed condition of said spring, said retainer having a tapped passage therethrough, a screw including a threaded portion for threaded engagement in said passage and a non-threaded inner end portion for sliding movement in said passage, means for securing said spring to the inner end of said screw to cause said spring to urge said screw normally outwardly for retraction of said arms to said normal position and to provide for deflection of said spring in response to inward movement and threading of said screw in said retainer and resulting projection of said arms into overlapping and interlocked relation with said flange, said screw also extending in non-threaded rotatable relation through said closure and including a head adapted to seat on the outer surface of said closure to draw said closure into sealed relation with said rim upon threaded movement of said screw into said retainer, and said connection between said closure and said retainer including loosely interfitting parts providing for limited axial movement of said closure with respect to said retainer to compensate for variations in the cross-sectional size of said gasket.

3. A filler cap assembly for the inlet of a container to retain positive pressure on the contents thereof, comprising means including an annular rim and a tubular flange extending from said rim inwardly of the container forming an inlet opening for said container, a closure including a compressible annular gasket adapted to seal against said rim, a retainer receivable within said opening and having slots therethrough, lugs on said closure extending axially inwardly of said closure and received through slots in said retainer, ears on the inner ends of said lugs preventing withdrawal of said lugs from said slots for maintaining connection of said retainer to said closure, a leaf spring carried by said retainer and having an outwardly spherically bowed shape in the unstressed condition thereof, said spring including a plurality of arms extending from the central portion thereof generally radially of said retainer, said retainer having a second set of slots therein for receiving and guiding said spring arms therethrough, said spring being proportioned in said unstressed condition thereof to retain said arms in said second set of slots and within the diameter of said opening for insertion of said retainer within said opening, a member on said retainer for deflecting said spring to substantially flat shape causing said arms to project radially of said retainer into overlapping and interlocked relation with said flange, means on said deflecting member for drawing said closure into sealed relation with said rim in response to deflecting movement of said deflecting member, and said lugs and said first mentioned slots being proportioned to provide for limited axial movement of said closure with respect to said retainer to compensate for variations in the cross-sectional size of said gasket.

4. A filler cap assembly for the inlet of a container, comprising means including an annular rim and a tubular flange extending from said rim inwardly of the container forming an inlet opening, a closure including a compressible annular gasket adapted to seal against said rim, a retainer receivable within said opening and having slots therethrough, lugs on said closure extending axially inwardly of said closure and received through slots in said retainer, ears on the inner ends of said lugs preventing withdrawal of said lugs from said slots, a leaf spring carried by said retainer and having an outwardly spherically bowed shape in the unstressed condition thereof, said spring including a plurality of arms extending generally radially of said retainer, said retainer having a second set of slots therein for receiving and guiding said spring arms therethrough, said spring being proportioned in said unstressed condition thereof to retain said arms in said second set of slots and within the diameter of said opening for insertion of said retainer within said opening, said retainer having a tapped passage therethrough, a screw including a threaded portion for threaded engagement in said passage and a non-threaded inner end portion for sliding movement in said passage, means for securing said spring to the inner end of said screw to cause said spring to urge said screw normally outwardly for retraction of said arms to said unstressed condition and to provide for deflection of said spring in response to inward movement and threading of said screw in said retainer and resulting projection of said arms into overlapping and interlocked relation with said flange, said screw also extending freely through said closure and including a head adapted to seat on the outer surface of said closure to draw said closure into sealed relation with said rim upon threaded movement of said screw into said retainer, and said lugs and said first mentioned slots being proportioned to provide for limited axial movement of said closure with respect to said retainer to compensate for variations in the cross-sectional size of said gasket.

5. A filler cap assembly for the inlet of a container to retain positive pressure on the contents thereof, comprising an adapter including an annular rim and a tubular flange extending from said rim inwardly of the container and forming the inlet opening, a closure proportioned to seat on said rim, an annular gasket carried by said closure for sealing against said rim in the closed position of said cover, a retainer having a connection with said closure and receivable within said flange, a multi-armed leaf spring carried by said retainer and having a generally spherically outwardly bowed shape in the unstressed condition thereof, said retainer having radial slots therethrough receiving said spring arms therethrough in guided relation, said spring being proportioned in said unstressed condition to retain the ends of said arms within said slots and said inlet opening for free insertion of said retainer into said flange, means carried by said retainer for flattening said spring to cause said arms to project into overlapping and locked relation with said flange, said flattening means including a portion connected with said closure to draw said closure into sealed relation with said rim following said projection of said arms, and said connection between said closure and said retainer including loosely interfitting parts providing for limited axial movement of said closure with respect to said retainer to compensate for variations in the cross-sectional size of said gasket.

6. A filler cap assembly for the inlet of a container to retain positive pressure on the contents thereof, comprising an adapter including an annular rim and a tubular flange extending from said rim inwardly of the container and forming the inlet opening, a closure proportioned to seat on said rim, an annular gasket carried by said closure for sealing against said rim in the closed position of said cover, a retainer having a connection with said closure and receivable within said flange, a multi-armed leaf spring carried by said retainer and having a generally spherically outwardly bowed shape in the unstressed condition thereof, said retainer having radial slots therethrough receiving said spring arms therethrough in guided relation, said spring being proportioned in said unstressed condition to retain the ends of said arms within said slots and said inlet opening for free insertion of said retainer into said flange, means carried by said retainer for flattening said spring to cause said arms to project into overlapping and locked relation with said flange, said slotted portion of said retainer being cylindrically curved about a radius relatively slightly less than the inner radius of said flange to provide support for said projecting ends of said arms correspondingly close to said flange, said flattening means including a portion connected with said closure to draw said closure into sealed relation with said rim following said projection of said arms, and said connection between said closure and said retainer including loosely interfitting parts providing for limited axial movement of said closure with respect to said retainer to compensate for variations in the cross-sectional size of said gasket.

References Cited in the file of this patent

UNITED STATES PATENTS

| | | |
|---|---|---|
| 458,525 | Farlow | Aug. 25, 1891 |
| 620,588 | Hoppes | Mar. 7, 1899 |
| 682,045 | De Carlo | Sept. 3, 1901 |
| 1,015,907 | Ryder | Jan. 30, 1912 |
| 1,918,883 | Zay | July 18, 1933 |
| 2,269,198 | Hicks | Jan. 6, 1942 |
| 2,283,371 | Johnson | May 19, 1942 |
| 2,306,699 | Johnson | Dec. 29, 1942 |